(12) United States Patent
Taraiya et al.

(10) Patent No.: US 11,396,124 B2
(45) Date of Patent: Jul. 26, 2022

(54) PROCESS FOR MODIFYING AND JOINING ORIENTED PIPES

(71) Applicant: SABIC GLOBAL TECHNOLOGIES B.V., Bergen op Zoom (NL)

(72) Inventors: Ajay Kumar Taraiya, Manjusar (IN); Ralf Kleppinger, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 283 days.

(21) Appl. No.: 16/498,837

(22) PCT Filed: Mar. 27, 2018

(86) PCT No.: PCT/EP2018/057705
§ 371 (c)(1),
(2) Date: Sep. 27, 2019

(87) PCT Pub. No.: WO2018/178038
PCT Pub. Date: Oct. 4, 2018

(65) Prior Publication Data
US 2020/0039138 A1    Feb. 6, 2020

(30) Foreign Application Priority Data
Mar. 30, 2017    (EP) ...................... 17163917

(51) Int. Cl.
*B29C 61/02*    (2006.01)
*B29C 55/26*    (2006.01)
(Continued)

(52) U.S. Cl.
CPC ............ *B29C 61/025* (2013.01); *B29C 55/26* (2013.01); *B29C 66/1142* (2013.01);
(Continued)

(58) Field of Classification Search
CPC ................ B29L 2023/22; F16L 13/004; B29C 66/73921; B29C 66/73713;
(Continued)

(56) References Cited

U.S. PATENT DOCUMENTS 3,899,565 A   8/1975   De Putter et al.
4,428,900 A   1/1984   Riley et al.
(Continued)

FOREIGN PATENT DOCUMENTS

CN    1438111 A    8/2003
CN    102029711 A    4/2011
(Continued)

OTHER PUBLICATIONS

"PE 100 Pipe systems" Second edition, edited by Heiner Brömstrup (2004), pp. 51-62.
(Continued)

*Primary Examiner* — Daniel Mcnally
(74) *Attorney, Agent, or Firm* — Cantor Colburn LLP (57) ABSTRACT

The invention relates to a modification process for modifying a biaxially oriented pipe, comprising a) providing a biaxially oriented pipe made by stretching a tube made of a thermoplastic polymer composition in the axial direction and in the peripheral direction, b) placing an insert within an end portion of the pipe, wherein the outer periphery of the cross section of the insert substantially matches the inner periphery of the cross section of the pipe and c) heating the end portion such that the end portion axially shrinks while the inner periphery of the cross section of the end portion is substantially maintained, to obtain a modified biaxially oriented pipe with a thickened end portion.

18 Claims, 2 Drawing Sheets

(51) Int. Cl.
B29C 65/00 (2006.01)
F16L 13/00 (2006.01)
B29L 23/00 (2006.01)

(52) U.S. Cl.
CPC ...... B29C 66/5221 (2013.01); B29C 66/7352 (2013.01); B29C 66/73713 (2013.01); B29C 66/73921 (2013.01); F16L 13/004 (2013.01); B29L 2023/22 (2013.01)

(58) Field of Classification Search
CPC ............ B29C 66/7352; B29C 66/5221; B29C 66/1142; B29C 55/26; B29C 61/025
See application file for complete search history.

(56) References Cited

U.S. PATENT DOCUMENTS

| | | | |
|---|---|---|---|
| 6,325,959 B1 | 12/2001 | Ek et al. | |
| 6,863,757 B1* | 3/2005 | Gonzalez | B29C 61/006 156/86 |
| 2002/0022101 A1* | 2/2002 | Lenthe | B29C 48/903 428/36.9 |
| 2005/0062182 A1 | 3/2005 | Van Lenthe et al. | |

FOREIGN PATENT DOCUMENTS

| | | |
|---|---|---|
| CN | 105034399 A | 11/2015 |
| CN | 205033555 U | 2/2016 |
| CN | 206812465 U | 12/2017 |
| EP | 2357389 A1 | 8/2011 |
| FR | 2892338 A1 | 4/2007 |
| PL | 198833 B1 | 7/2008 |
| WO | 2007003530 A1 | 1/2007 |
| WO | 2016133745 A1 | 8/2016 |

OTHER PUBLICATIONS

Alt et al.; "Bimodal Polyethylene—Interplay of Catalyst and Process"; Macromolecular Symposia; vol. 163, Issue 1; Jan. 2001; pp. 135-143.

Atkinson et al.;"The Joining of Biaxially Oriented Polyethylene Pipes"; Polymer Engineering and Science, vol. 29, No. 23, Mid-Dec. 1989, pp. 1638-1641.

International Preliminary Report On Patentability for International Application No. PCT/EP2018/057705; International Filing Date Mar. 27, 2018; 7 pages.

International Search Report for International Application No. PCT/EP2018/057705; International Filing Date Mar. 27, 2018, dated Jul. 27, 2018; 6 pages.

PE 100 Pipe Systems, second edition, Heiner Bromstrup (editor), 2004, pp. 35-42; ISBN 3-8027-2728-2.

PE 100 Pipe Systems, second edition, Heiner Bromstrup (editor), 2004, pp. 16-20 ISBN 3-8027-2728-2.

Peacock, Andrew J., "Handbook of Polyethylene", Chapter 3 Production Processes, 2000, Marcel Dekker, Inc., New York; ISBN 0824795466; p. 43-66.

Written Opinion for International Application No. PCT/EP2018/057705; International Filing Date Mar. 27, 2018, dated Jul. 27, 2018; 6 pages.

* cited by examiner

PROCESS FOR MODIFYING AND JOINING ORIENTED PIPES

CROSS REFERENCE TO RELATED APPLICATIONS

This application is a National Stage application of PCT/EP2018/057705 filed Mar. 27, 2018, which is incorporated herein by reference in its entirety, and which claims the benefit of European Application No. 17163917.2, filed Mar. 30, 2017.

BACKGROUND

The present invention relates to a modification process for modifying a biaxially oriented pipe. The present invention further relates to a pipe joining process of the so-obtained modified pipes.

It is known to improve the physical and mechanical properties of a polymer material by orienting the material. In many cases, orienting a material to improve a property in one direction leads to worsening of the same property in the direction perpendicular to the direction of orientation. In order to adapt the properties in both directions, a biaxial orientation of the material may be applied. The biaxial orientation means that the polymer material is oriented in two directions, perpendicular to one another. A pipe can be oriented in the axial direction and peripheral direction (hoop direction) to improve properties such as tensile strength.

End portions of pipes made of a biaxially oriented polymer can be joined by methods such as butt welding. However, when the butt ends are melted for butt welding, the pipe will have a lower burst pressure than before the butt welding since the orientation is lost at the butt ends. Accordingly, biaxially oriented polymer pipes are normally joined by mechanical methods in order to preserve their orientation. Another known way for joining pipes is by using electrofusion techniques as described by Atkinson et. al., POLYM ENG SCI., 1989, Vol. 29, No. 23, p. 1638-1641. It is desirable to provide a pipe joining process which avoids a large decrease of the mechanical properties at the joint.

It is an object of the invention to provide a process in which the above-mentioned and/or other problems are solved.

BRIEF SUMMARY

The invention relates to a modification process for modifying a biaxially oriented pipe, comprising a) providing a biaxially oriented pipe made by stretching a tube made of a thermoplastic polymer composition in the axial direction and in the peripheral direction, b) placing an insert within an end portion of the pipe, wherein the outer periphery of the cross section of the insert substantially matches the inner periphery of the cross section of the pipe and c) heating the end portion such that the end portion axially shrinks while the inner periphery of the cross section of the end portion is substantially maintained, to obtain a modified biaxially oriented pipe with a thickened end portion.

DETAILED DESCRIPTION

Accordingly, the invention provides a modification process for modifying a biaxially oriented pipe, comprising
a) providing a biaxially oriented pipe made by stretching a tube made of a thermoplastic polymer composition in the axial direction and in the peripheral direction,
b) placing an insert within an end portion of the pipe, wherein the outer periphery of the cross section of the insert substantially matches the inner periphery of the cross section of the pipe and
c) heating the end portion such that the end portion axially shrinks while the inner periphery of the cross section of the end portion is substantially maintained, to obtain a modified biaxially oriented pipe with a thickened end portion.

The invention further provides a pipe joining process, comprising
I) performing the modification process according to the invention to obtain a first modified biaxially oriented pipe and a second modified biaxially oriented pipe and
II) joining the butt-end of the thickened end portion of the first biaxially oriented pipe and the butt-end of the thickened end portion of the second biaxially oriented pipe.

The terms "pipe" and "tube" are herein understood as a hollow elongated article. The cross section may be of various shapes e.g. be circular, elliptical, square, rectangular or triangular. The term "diameter" is herein understood as the largest dimension of the cross section.

The outer periphery of the cross section of the insert substantially matches the inner periphery of the cross section of the pipe. This means that the outer periphery of the cross section of the insert and the inner periphery of the cross section of the pipe have the same shape (i.e. both of them are circular or both of them are square etc.) and the diameter of the outer periphery of the cross section of the insert is equal to or slightly smaller than the diameter of the inner periphery of the cross section of the pipe, e.g. the diameter of the outer periphery of the cross section of the insert is 95-100% of the diameter of the inner periphery of the cross section of the pipe.

According to the modification process of the invention, a matching insert is placed within one end of the biaxially oriented pipe. This end portion of the pipe is heated close to the melting temperature of the pipe material while the rest of the pipe is not heated. Upon heating, the degree of orientation of the thermoplastic polymer at the end portion is decreased and the end portion shrinks axially while its inner periphery is maintained due to the presence of the insert. This results in the end portion with an increased thickness.

These thickened end portions can be joined at their butt-ends without any further change in their dimensions. The joining results in an almost complete loss of the orientation at the butt-end, as in the conventional processes. However, according to the modification process of the invention, a relatively high burst pressure at the joined butt ends is obtained. While the loss of orientation at the joined butt ends reduces the burst pressure, the increased thickness of the end portion increases the burst pressure. Consequently, the burst pressure at the joined butt ends is much higher than the joined butt ends made according to conventional processes.

It was found that during the formation of the thickened end portion the degree of orientation in the thickened end portion is retained to a larger degree in the hoop direction than in the axial direction. Further, during the joining step the orientation is retained to a certain degree in the thickened end portion except for the butt end. The retention of the orientation in the joined end portions may further contribute to the maintenance of the burst pressure.

The preparation of the biaxially oriented pipe, modifying the end portion of the pipe and joining the so-obtained pipes can advantageously be performed in the same plant site. Alternatively, modifying and the joining of the pipes can be performed in the pipe laying site. The possibility to perform the modification and the joining of the pipes at the production site or the pipe laying site is highly advantageous for the efficiency of the pipe installation. This is made possible by the fact that no special equipment is required, unlike conventional mechanical joining methods.

Step a)

In step a), a biaxially oriented pipe made by stretching a tube made of a thermoplastic polymer composition in the axial direction and in the peripheral direction is provided. Preferably, the stretching has been performed in the axial direction at an axial draw ratio of 1.1 to 5.0 and in the peripheral direction at an average hoop draw ratio of 1.1 to 2.0.

Preferably, step a) involves a1) forming a thermoplastic polymer composition into a tube and a2) stretching the tube of step a1) in the axial direction at an axial draw ratio of 1.1 to 5.0 and in the peripheral direction at an average hoop draw ratio of 1.1 to 2.0 to obtain the biaxially oriented pipe.

Step a1)

Thermoplastic Polymer Composition

Preferably, thermoplastic polymer composition comprises a thermoplastic polymer selected from the group consisting of polyethylene, polypropylene, polyvinylchloride, polyester, polycarbonate, polyamide, polyacetal, polyimide, polyvinylidene fluoride and polyether ether ketone and combinations thereof.

A preferred example of the thermoplastic polymer is polyethylene, such as high-density polyethylene (HDPE), linear low-density polyethylene (LLDPE) and low-density polyethylene (LDPE), and particularly preferred is high-density polyethylene (HDPE). Another preferred example of the thermoplastic polymer is polypropylene, preferably random polypropylene.

Polyethylene

The production processes of HDPE, LLDPE and LDPE are summarised in Handbook of Polyethylene by Andrew Peacock (2000; Dekker; ISBN 0824795466) at pages 43-66.

HDPE

HDPE may be an ethylene homopolymer or may comprise a comonomer, for example butene or hexene.

Preferably, the HDPE has a density of 940-960 kg/m$^3$, more preferably 940-955 kg/m$^3$, measured according to ISO1183.

Preferably, the HDPE has a Melt Flow Rate of 0.1-4 g/10 min, more preferably 0.1-1 g/10 min, measured according to ISO1133-1:2011 (190° C./5 kg).

In some embodiments, the composition comprises a compound comprising the HDPE and a colorant, wherein the compound has a density of 947-965 kg/m$^3$ measured according to ISO1183. The colorant may e.g. be carbon black or a pigment having a color of e.g. black, blue or orange. The amount of the colorant is typically 1-5 wt %, more typically 2-2.5 wt %, with respect to the compound comprising the HDPE and the colorant, the rest typically being the HDPE.

The HDPE may be unimodal, bimodal or multimodal. Preferably, the HDPE is bimodal or multimodal. Such HDPEs have properties suitable for producing a pipe.

It is understood that a bimodal HDPE has a molecular weight distribution having two peaks corresponding to the first median and the second median of the respective stages in the polymerization. It is similarly understood that a multimodal HDPE has a molecular weight distribution having multiple peaks corresponding to the first median, the second median and one or more further medians of the respective stages in the polymerization.

The HDPE can be produced by using low pressure polymerisation processes. For example, pipe materials of the performance class PE 80 and PE 100 are known, which are generally produced in cascade plants by a so called bimodal or multimodal process. The production processes for bimodal HDPE are summarised at pages 16-20 of "PE 100 Pipe systems" (edited by Bromstrup; second edition, ISBN 3-8027-2728-2).

Suitable low pressure processes are slurry cascade of stirred reactors, slurry cascade of loop reactors and a combination of different processes such as slurry loop gas phase reactor. It is also possible to use a multimodal polyethylene, preferably trimodal polyethylene, as described for example in WO2007003530, as high density polyethylene pipe material.

The performance classes PE 80 and PE 100 are discussed at pages 35-42 of "PE 100 Pipe systems" (edited by Bromstrup; second edition, ISBN 3-8027-2728-2). The quality test methods are described at pages 51-62 of "PE 100 Pipe systems".

The production of bimodal high density polyethylene (HDPE) via a low pressure slurry process is described by Alt et al. in "Bimodal polyethylene-Interplay of catalyst and process" (Macromol. Symp. 2001, 163, 135-143). In a two stage cascade process the reactors may be fed continuously with a mixture of monomers, hydrogen, catalyst/co-catalyst and hexane recycled from the process. In the reactors, polymerisation of ethylene occurs as an exothermic reaction at pressures in the range between for example 0.5 MPa (5 bar) and 1 MPa (10 bar) and at temperatures in the range between for example 75° C. and 85° C. The heat from the polymerisation reaction is removed by means of cooling water. The characteristics of the polyethylene are determined amongst others by the catalyst system and by the applied concentrations of catalyst, co monomer and hydrogen.

The concept of the two stage cascade process is elucidated at pages 137-138 by Alt et al. "Bimodal polyethylene-Interplay of catalyst and process" (Macromol. Symp. 2001, 163). The reactors are set up in cascade with different conditions in each reactor including low hydrogen content in the second reactor. This allows for the production of HDPE with a bimodal molecular mass distribution and defined co monomer content in the polyethylene chains.

Preferred examples of the HDPE include a unimodal or bimodal PE 80, a bimodal PE 100 and a multimodal HDPE resin. PE 80 is a PE material with an MRS (minimum required strength after 50 years for water at 20 degrees Celsius) of 8 MPa and PE 100 is a PE material with an MRS of 10 MPa. The pipe classification is elucidated at page 35 of "PE 100 Pipe systems" (edited by Bromstrup; second edition, ISBN 3-8027-2728-2).

Preferably, the HDPE or the compound comprising the HDPE and the colorant has one or more of, preferably all of, the following characteristics:

Tensile modulus of 500-1400 MPa, preferably 700-1200 MPa (according to ISO 527-2)

Yield stress of 15-32 MPa, preferably 18-28 MPa (according to ISO 527-2)

Full Notch Creep Test (FNCT): 100-20000 h (according to ISO 16770 @ 80 degrees centigrade/4 MPa)

Charpy of 10-35° C. @ 23° C., preferably 14-30° C. (according to ISO 1 eA).

LLDPE

The technologies suitable for the LLDPE manufacture include gas-phase fluidized-bed polymerization, polymerization in solution, polymerization in a polymer melt under very high ethylene pressure, and slurry polymerization.

The LLDPE comprises ethylene and a C3-C10 alpha-olefin comonomer (ethylene-alpha olefin copolymer). Suitable alpha-olefin comonomers include 1-butene, 1-hexene, 4-methyl pentene and 1-octene. The preferred co monomer is 1-hexene. Preferably, the alpha-olefin co monomer is present in an amount of about 5 to about 20 percent by weight of the ethylene-alpha olefin copolymer, more preferably an amount of from about 7 to about 15 percent by weight of the ethylene-alpha olefin copolymer.

Preferably, the LLDPE has a density of 900-948 kg/m$^3$, more preferably 915-935 kg/m$^3$, more preferably 920-935 kg/m$^3$, determined according to ISO1872-2.

Preferably, the LLDPE has a Melt Flow Rate of 0.1-3.0 g/10 min, more preferably 0.3-3.0 g/10 min, determined according to ISO1133-1:2011 (190° C./2.16 kg).

LDPE

The LDPE may be produced by use of autoclave high pressure technology and by tubular reactor technology.

LDPE may be an ethylene homopolymer or may comprise a comonomer, for example butene or hexene.

Preferably, the LDPE has a density of 916-940 kg/m$^3$, more preferably 920-935 kg/m$^3$, determined according to ISO1872-2.

Preferably, the LLDPE has a Melt Flow Rate of 0.1-3.0 g/10 min, more preferably 0.3-3.0 g/10 min, determined according to ISO1133-1:2011 (190° C./2.16 kg).

Polyethylene Composition

Preferably, the thermoplastic polymer composition comprises HDPE. In some embodiments, the polyethylene composition comprises a further polyethylene other than HDPE. The further polyethylene may e.g. be linear low-density polyethylene (LLDPE), low-density polyethylene (LDPE) or a combination of LLDPE and LDPE. Preferably, the further polyethylene is LLDPE or a combination of LLDPE and LDPE. More preferably, the further polyethylene is LLDPE. In case the further polyethylene is a combination of LLDPE and LDPE, the weight ratio of LLDPE to LDPE may e.g. be at least 0.1, for example at least 0.2 or at least 0.3 and at most 10, for example at most 5 or at most 3. Preferably, the weight ratio of LLDPE to LDPE is at least 1, for example 2 to 10. Preferably, the weight ratio of HDPE to the further polyethylene in the polyethylene composition is more than 1, preferably 1.2-5, for example 1.5-4 or 2-3.

In some embodiments, the thermoplastic polymer composition essentially comprises no further polyethylene other than HDPE. The amount of HDPE in polyethylene in the polyethylene composition may be at least 95 wt %, at least 98 wt %, at least 99 wt % or 100 wt %.

Preferably, the thermoplastic polymer composition comprising HDPE has a Melt Flow Rate of 0.1-4 g/10 min, more preferably 0.1-1 g/10 min, measured according to ISO1133-1:2011 (190° C./5 kg).

Other Polymers

Another preferred example of the thermoplastic polymer is polypropylene, preferably a random propylene copolymer.

The term "random propylene copolymer," as used herein, is a copolymer containing monomers of propylene and monomers of α-olefin polymerized together to form a polymer wherein the individual repeating units are present in a random or statistical distribution in the polymer chain.

Additives

The thermoplastic polymer composition may comprise components other than the thermoplastic polymer, such as additives and fillers.

Examples of the additives include nucleating agents; stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; and/or components that enhance interfacial bonding between polymer and filler, such as a maleated polyethylene. The amount of the additives is typically 0 to 5 wt %, for example 1 to 3 wt %, with respect to the total composition.

Examples of fillers include glass fibers, talc, mica, nanoclay. The amount of fillers is typically 0 to 40 wt %, for example 5 to 30 wt % or 10 to 25 wt %, with respect to the total composition.

Accordingly, in some embodiments, the composition further comprises 0 to 5 wt % of additives and 0 to 40 wt % of fillers.

The thermoplastic composition may be obtained by melt-mixing the thermoplastic polymer optionally with any other optional components.

Preferably, the total amount of the thermoplastic polymer and the optional additives and the optional fillers is 100 wt % with respect to the total thermoplastic polymer composition.

In some embodiments, the total amount of polyethylene with respect to the total amount of polymers present in the thermoplastic polymer composition is at least 95 wt %, at least 98 wt %, at least 99 wt % or 100 wt %.

In some embodiments, the total amount of polyethylene with respect to the total thermoplastic polymer composition is at least 90 wt %, at least 95 wt %, at least 98 wt %, at least 99 wt % or 100 wt %.

Process Steps

The thermoplastic polymer composition may be formed into a tube (step a1) by any known method, such as extrusion or injection moulding. The biaxial elongation (step a2) may be performed by any known method.

Methods for forming a thermoplastic polymer composition into a tube and the biaxial elongation of the tube are described in U.S. Pat. No. 6,325,959:

A conventional plant for extrusion of plastic pipes comprises an extruder, a nozzle, a calibrating device, cooling equipment, a pulling device, and a device for cutting or for coiling-up the pipe. By the molten mass of polymer on its way from the extruder through the nozzle and up to calibration, cooling and finished pipe being subjected to shear and elongation etc. in the axial direction of the pipe, an essentially uniaxial orientation of the pipe in its axial direction will be obtained. A further reason that contributes to the orientation of the polymer material in the direction of material flow is that the pipe can be subjected to tension in connection with the manufacture.

To achieve biaxial orientation, this plant can be supplemented, downstream of the pulling device, with a device for temperature control of the pipe to a temperature that is suitable for biaxial orientation of the pipe, an orienting device, a calibrating device, a cooling device, and a pulling device which supplies the biaxially oriented pipe to a cutting device or coiler.

The biaxial orientation can also be carried out in direct connection with the first calibration after extrusion, in which case the above-described supplementary equipment succeeds the first calibrating device.

The biaxial orientation of the pipe can be carried out in various ways, for instance mechanically by means of an internal mandrel, or by an internal pressurised fluid, such as air or water or the like. A further method is the orienting of the pipe by means of rollers, for instance by arranging the pipe on a mandrel and rotating the mandrel and the pipe relative to one or more pressure rollers engaging the pipe, or via internally arranged pressure rollers that are rotated relative to the pipe against an externally arranged mould or calibrating device.

Conditions for Step a2)

Preferably, step a2) is performed at a drawing temperature which is 1 to 30° C. lower than the melting point of the thermoplastic polymer composition, for example 2 to 20° C. or 3 to 10° C. lower than the melting point of the thermoplastic polymer composition. When more than one melting point can be measured for the thermoplastic polymer composition, step b) is preferably performed at a drawing temperature which is 1 to 30° C. lower than the highest melting point of the thermoplastic polymer composition, for example 2 to 20° C. or 3 to 10° C. lower than the highest melting point of the thermoplastic polymer composition.

In embodiments where the thermoplastic polymer comprises HDPE, step a2) may also be performed at a drawing temperature which is 1 to 30° C. lower than the melting point of the HDPE, for example 2 to 20° C. or 3 to 10° C. lower than the melting point of the HDPE.

In some embodiments, step a2) is performed at a drawing temperature of 115-123° C.

Preferably, the axial draw ratio is 1.1 to 5. Preferably, the axial draw ratio is at least 1.2, at least 1.3, at least 1.5 or at least 1.8 and/or at most 4.0, at most 3.5, at most 3.2, at most 3.0, at most 2.8 or at most 2.5. Preferably, the average hoop draw ratio is at least 1.2 or at least 1.3 and/or at most 1.8 or at most 1.6.

The axial draw ratio of the drawn pipe is defined as the ratio of the cross-sectional area of the starting isotropic tube to that of the biaxially oriented pipe (i.e. product), that is, $$\lambda_{axial} = \frac{(\text{Tube } OD)^2 - (\text{Tube } ID)^2}{(\text{Product } OD)^2 - (\text{Product } ID)^2}$$

OD stands for outer diameter and ID stands for inner diameter.

The average hoop draw ratio can be defined as:

$$\lambda_{averagehoop} = \frac{\text{Total Draw Ratio } \lambda_{Total}}{\text{Axial Draw Ratio } \lambda_{axial}}$$

Where $$\lambda_{Total} = \frac{\text{Tube Wall Thickness}}{\text{Product Wall Thickness}}$$

Biaxially Oriented Pipe

The biaxially oriented pipe of step a) may be a pressure pipe or a non-pressure pipe. The preferred pipe is a pressure pipe.

The biaxially oriented pipe may typically have a thickness of 0.3 mm to 100 mm. The biaxially oriented pipe may typically have an outer diameter of 2 mm to 2000 mm. In some examples, the biaxially oriented pipe has an outer diameter of 2 mm to 10 mm and a thickness of 0.3 mm to 2 mm. In some examples, the biaxially oriented pipe has an outer diameter of 10 mm to 100 mm and a thickness of 1 mm to 3 mm. In some examples, the biaxially oriented pipe has an outer diameter of 100 mm to 500 mm and a thickness of 1 mm to 10 mm. In some examples, the biaxially oriented pipe has an outer diameter of 500 mm to 2000 mm and a thickness of 5 mm to 100 mm.

In some examples, the biaxially oriented pipe has an outer diameter of 32 mm to 110 mm and a thickness of 3 mm to 10 mm. Examples of suitable biaxially oriented pipes of step a) have the following outer diameter and inner diameter and wall thickness.

| Outer diameter (mm) | Inner diameter (mm) | Wall thickness (mm) |
| --- | --- | --- |
| 110 | 90 | 10.0 |
| 90 | 73.6 | 8.2 |
| 75 | 61.4 | 6.8 |
| 63 | 51.4 | 5.8 |
| 32 | 26 | 3.0 |

Step b) and Step c)

In step b), an insert is placed within an end portion of the pipe.

In step c), the end portion is heated such that the end portion axially shrinks while the inner periphery of the cross section of the end portion is substantially maintained. A modified biaxially oriented pipe with a thickened end portion is thereby obtained.

Step c) may involve heating the end portion from the inside and/or the outside of the end portion. It was found that heating from the inside of the end portion reduces the degree of axial and peripheral orientation at the inner surface, but the degree of peripheral orientation is largely maintained at the outer surface. Similarly, heating from the outside of the end portion reduces the degree of axial and peripheral orientation at the outer surface, but the degree of peripheral orientation is largely maintained at the inner surface.

When a high production speed is important, the end portion is preferably heated from the inside and the outside of the end portion.

The location of the heating influences where the orientation is maintained. Heating only from the inside or only from the outside of the end portion can be used to influence the degree of orientation. When maintaining the degree of orientation is important, the end portion is preferably heated only from the outside of the end portion. The degree of orientation in the peripheral direction is typically higher at the inner surface than the outer surface. Accordingly, the reduction in the degree of orientation affects the inner surface more than the outer surface. By avoiding heating from the inside of the end portion, the peripheral orientation at the inner surface is maintained.

When the end portion is heated at least from the inside of the end portion, step c) preferably involves heating at least part of the insert.

In some embodiments, the insert comprises a thermally conductive portion and a thermally insulating portion. In this case, step b) involves placing the insert in the pipe such that the thermally conductive portion is closer to the butt-end of the end portion of the pipe than the thermally insulating portion. This may typically be done by placing the insert such that the end of the thermally conductive portion is flush with the butt-end of the end portion of the pipe. Step c)

involves heating only the thermally conductive portion of the insert. The thermally insulating portion may suitably be made of a metal, e.g. steel. The thermally insulating portion may e.g. be made of nylon.

Preferably, in step c), the thermally conductive portion of the end portion is heated at a temperature at or higher than the drawing temperature. The heating temperature in step c) may e.g. be up to 5° C. higher than the drawing temperature.

Preferably, the thickened end portion has a thickness which is 110-250% of the original thickness of the end portion.

Preferably, the thickened end portion has a minimum ultimate tensile load of at least 80%, preferably at least 90%, more preferably at least 100%, of the minimum ultimate tensile load of the end portion of the original pipe measured by ASTM D2290.

Modified Pipe

The invention also relates to the modified biaxially oriented pipe obtainable or obtained by the modifying process according to the invention.

Pipe Joining Process

The invention provides a pipe joining process. In step I), the modification process according to the invention is performed to obtain a first modified biaxially oriented pipe and a second modified biaxially oriented pipe. In step II), the butt-end of the thickened end portion of the first biaxially oriented pipe and the butt-end of the thickened end portion of the second biaxially oriented pipe are joined. This may involve butt-welding, solvent joining or electrofusion.

Butt-welding involves heating the end portions of the pipes to above the melting point of the pipe material and attaching the butt ends, followed by cooling.

In solvent welding, a solvent is applied which can temporarily dissolve the polymer at room temperature. The dissolved butt ends are attached. Given sufficient time, the solvent will permeate through the polymer and out into the environment, so that the chains lose their mobility.

Electrofusion is described in Atkinson et. al., POLYM ENG SCI., 1989, Vol. 29, No. 23, p. 1638-1641.

Joined Pipe

The invention also relates to the joined pipe obtainable or obtained by the pipe joining process according to the invention.

The invention also relates to a joined pipe comprising two biaxially oriented pipes and a joint portion between the two biaxially oriented pipes, wherein the biaxially oriented pipes has an outer diameter of 2 mm to 2000 mm and a thickness of 0.3 mm to 100 mm and are obtained by drawing a tube made of a thermoplastic polymer composition at an axial draw ratio of 1.1-5.0 and a hoop draw ratio of 1.1-2.0, wherein the joint portion is made of the same thermoplastic polymer composition as the tube,
wherein the two biaxially oriented pipes and the joint portion have the same inner diameter and
the joint portion has a larger thickness than the biaxially oriented pipes.

Preferably, the joint portion has a thickness which is 110-250% of the thickness of the biaxially oriented pipes.

Preferably, the joint portion has a minimum ultimate tensile load of at least 80%, preferably at least 90%, more preferably at least 100%, of the minimum ultimate tensile load of the biaxially oriented pipes measured according to ASTM D2290.

Use

The invention also relates to use of the joined pipe according to the invention for pressure pipes for gas, water and industrial applications or building and constructions applications such as scaffolding and roof support.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

Preparation of Die-Drawn Pipes

Circular HDPE tubes of outer diameter 60 mm and inner diameter 25 mm were melt extruded. These thick isotropic tubes were drawn over a conical mandrel of exit diameter 59 mm at a temperature of 120° C.

Biaxially oriented pipes were produced using the batch die-drawing facility. A series of biaxially oriented pipes with an outer diameter of 64.9(±0.8)mm and an inner diameter of 56.6(±0.3)mm were prepared by drawing at an axial draw ratio of about 3.5 and an average hoop draw ratio of about 1.4.

Preparation of Thickened End Portions

Figure 1:
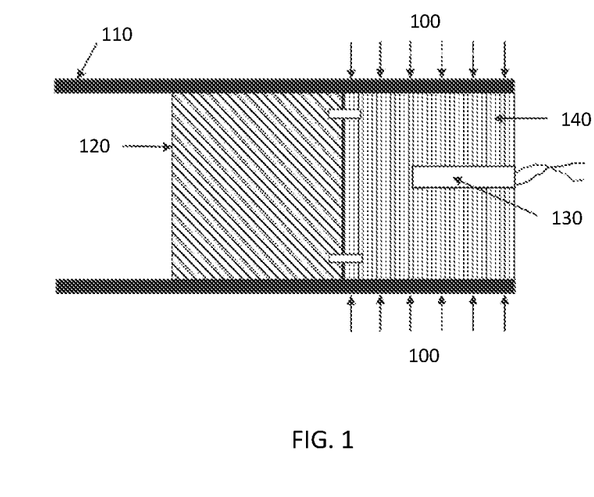
FIG. 1 is an illustration of a heating tool used for preparation of the end portion of a pipe at time t=0.
Figure 2:
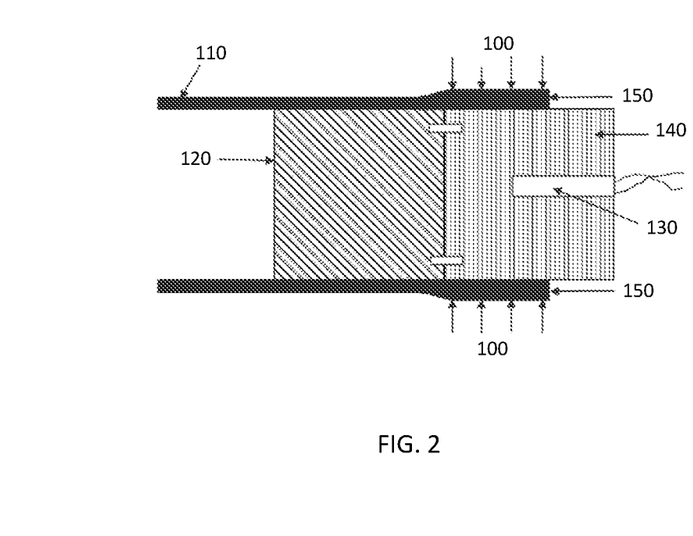
FIG. 2 is an illustration of the heating tool used for preparation of the end portion of the pipe at time t=10 minutes.

A cylindrical insert of the same outer diameter as the inner diameter of the oriented pipe was placed inside one end of the biaxially oriented pipe. This insert is made of a cylinder made of steel and a cylinder made of nylon joined together. The insert was inserted in the oriented pipe such that the end of the steel cylinder is flush with the butt-end. The steel cylinder was heated to 130-140° C., close to the melting temperature of the HDPE pipe material while the rest of the pipe in its vicinity was kept well below this temperature over the nylon cylinder. This setup is shown in FIGS. 1 and 2. FIGS. 1 and 2 illustrate the heating tool used for preparation of the end portions of pipes at time t=0 and t=10 minutes, respectively.

Upon heating the pipe end, the pipe end started shrinking axially while the inner diameter was maintained due to constraint by the insert. The outer and inner diameters of the end portions changed from values of 64.9(±0.8)mm and 56.6(±0.3)mm to 70.6(±0.4)mm and 54.5(±0.5)mm. The process ultimately resulted in a significant increase in the wall thickness of the end portion from 4.1 mm to 8 mm.

Burst Pressures

The burst pressures of pipes can be calculated via Lame relation $$P = S\frac{(D^2 - d^2)}{(D^2 + d^2)}$$

where P represents the burst pressure, S the minimum ultimate tensile strength of pipe material, D the outer pipe diameter and d the inner pipe diameter. The minimum ultimate tensile strength of pipe material is measured as hoop tensile strength of pipes measured using split disk method ASTM D2290. Table 1 shows the variations in burst pressures, calculated for different values of the pipe dimensions to illustrate the influence of the pipe wall thickness.

TABLE 1

| pipe | S [MPa] | D [mm] | d [mm] | Wall thickness [mm] | P [MPA] |
|---|---|---|---|---|---|
| isotropic | 20 | 63 | 51.4 | 5.8 | 4.0 |
| biaxially oriented | 35 | 63 | 51.4 | 5.8 | 7.0 |
| annealed end | 25[1] | 70 | 51.4 | 9.3 | 7.5 |
|  | 25[1] | 72 | 51.4 | 10.3 | 8.1 |
|  | 20[2] | 70 | 51.4 | 9.3 | 6.0 |
|  | 20[2] | 72 | 51.4 | 10.3 | 6.5 |

[1]Partial loss of orientation
[2]Complete loss of orientation at the joints

These calculations demonstrate that the joints having a high wall thickness have a high burst pressure, which will compensate for the loss of the orientation.

Changes in the Crystalline Morphology Related to Heating

A series of pole figure diagrams were derived from WAXD experiments on each sample, machined from different positions within the pipe cross sections.

It was found that the heating resulted in melting and a loss of orientation within a very narrow region near the inner pipe surface. The orientation at the outer pipe surface was maintained to a large degree. There was a higher decrease in the degree of orientation in the axial direction than in the hoop direction.

| Brief Description of the Drawing Numbers | |
|---|---|
| 100 | Heat |
| 110 | Oriented Pipe |
| 120 | Thermally Insulating Cylinder |
| 130 | Heater |
| 140 | Metal Cylinder |
| 150 | Axial Shrinkage |

The invention claimed is:

1. A modification process for modifying a biaxially oriented pipe, comprising
a) providing a biaxially oriented pipe made by stretching a tube made of a thermoplastic polymer composition in the axial direction and in the peripheral direction,
b) placing an insert within an end portion of the pipe, wherein the outer periphery of the cross section of the insert substantially matches the inner periphery of the cross section of the pipe, and
c) heating the end portion such that the end portion axially shrinks while the inner periphery of the cross section of the end portion is substantially maintained, to obtain a modified biaxially oriented pipe with a thickened end portion.

2. The process according to claim 1, wherein step a) involves
a1) forming a thermoplastic polymer composition into a tube, and
a2) stretching the tube of step a1) in the axial direction at an axial draw ratio of 1.1 to 5.0 and in the peripheral direction at an average hoop draw ratio of 1.1 to 2.0 to obtain the biaxially oriented pipe.

3. The process according to claim 2, wherein step a2) involves drawing the tube at a drawing temperature which is 1 to 30° C. lower than the melting point of the thermoplastic polymer composition.

4. The process according to claim 3, wherein step c) involves heating the end portion at a temperature at or higher than the drawing temperature.

5. The process according to claim 1,
wherein step a) involves
a1) forming a thermoplastic polymer composition into a tube, and
a2) stretching the tube of step a1) in the axial direction at an axial draw ratio of 1.1 to 5.0 and in the peripheral direction at an average hoop draw ratio of 1.1 to 2.0, and drawing the tube at a drawing temperature which is 1 to 30° C. lower than the melting point of the thermoplastic polymer composition, to obtain the biaxially oriented pipe,
wherein the insert comprises a thermally conductive portion and a thermally insulating portion,
wherein step b) involves placing the insert in the pipe such that the thermally conductive portion is closer to the butt-end of the end portion of the pipe than the thermally insulating portion, and
wherein step c) involves heating the thermally conductive portion of the insert.

6. The process according to claim 5, wherein the thermoplastic polymer comprises high density polyethylene or random polypropylene.

7. The process according to claim 5, wherein the thickened end portion has a thickness which is 110-250% of the original thickness of the end portion, wherein the original thickness of the end portion is 0.3 mm to 100 mm.

8. The process according to claim 1, wherein the end portion is heated from the inside and/or the outside of the end portion.

9. The process according to claim 1, wherein the insert comprises a thermally conductive portion and a thermally insulating portion, wherein step b) involves placing the insert in the pipe such that the thermally conductive portion is closer to the butt-end of the end portion of the pipe than the thermally insulating portion and step c) involves heating the thermally conductive portion of the insert.

10. The process according to claim 1, wherein the thermoplastic polymer is selected from the group consisting of polyethylene, polypropylene, polyvinylchloride, polyester, polycarbonate, polyamide, polyacetal, polyimide, polyvinylidene fluoride and polyether ether ketone and combinations thereof.

11. The process according to claim 1, wherein the thermoplastic polymer comprises high density polyethylene or random polypropylene.

12. The process according to claim 1, wherein the thickened end portion has a thickness which is 110-250% of the original thickness of the end portion.

13. The process according to claim 1, wherein the original thickness of the end portion is 0.3 mm to 100 mm.

14. The process according to claim 1, wherein the thickened end portion has a minimum ultimate tensile load of at least 80% of the minimum ultimate tensile load of the end portion of the original pipe measured according to ASTM D2290.

15. The process according to claim 1, wherein the thickened end portion has a minimum ultimate tensile load of at least 100% of the minimum ultimate tensile load of the end portion of the original pipe measured according to ASTM D2290.

16. The process according to claim 1, wherein the thickened end portion has a minimum ultimate tensile load of at least 90% of the minimum ultimate tensile load of the end portion of the original pipe measured according to ASTM D2290.

17. A pipe joining process, comprising
   I) performing the modification process according to claim 1 to obtain a first modified biaxially oriented pipe and a second modified biaxially oriented pipe and
   II) joining the butt-end of the thickened end portion of the first biaxially oriented pipe and the butt-end of the thickened end portion of the second biaxially oriented pipe.

18. The pipe joining process according to claim 17, wherein step II) involves-welding, solvent joining or electrofusion.

\* \* \* \* \*